Patented May 19, 1931

1,806,183

UNITED STATES PATENT OFFICE

LEON IRWIN SHAW, OF OAK PARK, ILLINOIS, ASSIGNOR TO WESTERN ELECTRIC COMPANY, INCORPORATED, OF NEW YORK, N. Y., A CORPORATION OF NEW YORK

SUSPENSION

No Drawing. Application filed February 29, 1928. Serial No. 258,135.

This invention relates to suspensions and more particularly to suspensions for use in glazing and enameling operations.

It has heretofore been the practice in some instances to produce suspensions by employing clay in conjunction with other ingredients, such as bentonite, magnesium sulphate, etc., as a floating agent for solids of relatively high density. In one type of suspension of commercial importance, such agents are employed for floating glazes and enamels during the application thereof to the objects which they are intended to cover. However, because of the lack of uniformity in natural clays, it has been difficult to obtain uniform results in glazing and enameling operations utilizing compositions in which clay was employed as a floating agent for the glazing or enameling ingredients. Furthermore, materials such as bentonite, which when heated decompose with the evolution of gases, are undesirable for use in enameling compositions because when used in sufficient quantities to effectively float the more dense ingredients of the enameling composition, they decompose with the evolution of such a quantity of gaseous material during the baking of the enamel that a rough surface is produced upon the finished enameled part by the escape of the gases.

The object of this invention is to provide suspensions of matter including inexpensive and effective floating agents of uniform character, a small quantity of which will serve to suspend large quantities of relatively dense solids.

In accordance with the general features of the invention as embodied in one form thereof, an enameling composition is prepared by mixing a fusible, relatively dense material, such as a lead glass, in a solution containing a small quantity of a soluble alginate as a floating agent, thereby producing a suspension of a fusible material in the solution.

Other objects and features of the invention will be apparent from the following detailed description of an enameling composition embodying the invention.

Enameling compositions embodying the invention which give satisfactory results may be made up of a fusible glass, such as lead glass or feldspar glass, of such grades as are commonly used in making enameling compositions, which has been ground sufficiently fine to pass through a 140 mesh screen, a pigment, water, and less than 1% of ammonium alginate. One formula which gives very satisfactory results is as follows:

Finely ground lead glass 100 parts,
Tin oxide 3 parts,
23% ammonium alginate solution 2.5 parts,
Water 30 parts.

In an enameling composition made in accordance with this formula, the lead glass and the tin oxide are maintained in suspension by the small percentage of ammonium alginate present therein, and the composition may be readily applied in a uniform coating upon a part which it is desired to coat. The thus coated part may then be fired in the usual manner to harden the enamel thereon, whereupon the water present will be evaporated and the ammonium alginate will be decomposed and volatilized, the lead glass and the tin oxide forming a smooth, opaque coating upon the part. Although the ammonium alginate decomposes when the enameling composition is heated, it is present in such a small quantity (approximately .5 per cent in the formula tabulated above) that insufficient gas is generated by its decomposition to roughen the surface of the finished enameled coating.

Although in the specific embodiment of the invention described hereinbefore, ammonium alginate is given as the specific floating agent employed, other soluble salts of alginic acid, such as sodium, potassium and lithium alginates, may also be employed with satisfactory results. Also, alginates are not limited in their use to the flotation of glazes and enamels, but they may be employed with equal success as floating agents for various insoluble solids of relatively high density to form suspensions thereof in any liquid in which the particular alginate employed is soluble.

Glazes and enamels made in accordance with this invention are not only of uniform quality and produce smooth surfaces on finished parts, but they also possess the added advantage of great initial adhesiveness. Furthermore, the use of alginates as floating agents for glazes and enamels does not tend to raise the fusion point of the product as does a highly refractory floating agent such as clay.

What is claimed is:

1. In an enameling composition, a fusible glass, and a floating agent comprising a volatile, soluble alginate.

2. In an enameling composition, a lead glass, and a floating agent comprising less than 1% of a soluble alginate.

3. In an enameling composition, a fusible lead glass, and a floating agent comprising approximately .5% of ammonium alginate.

4. An enameling composition, comprising lead glass, tin oxide, water and a soluble alginate.

5. An enameling composition, comprising substantially 100 parts of lead glass, 3 parts of tin oxide, 2.5 parts of a 23% ammonium alginate solution, and 30 parts of water.

6. An enameling composition comprising finely divided fusible glass and a floating agent comprising between .5% and 1% of ammonium alginate.

7. In an enameling composition, a floating agent comprising a soluble alginate, and a fusible vitreous enameling material held in suspension by said floating agent.

8. An enameling composition, comprising a pigment, water, a volatile, soluble alginate, and a fusible vitreous enameling material held in suspension by said floating agent.

In witness whereof, I hereunto subscribe my name this 3d day of February A. D., 1928.

LEON IRWIN SHAW.